United States Patent [19]

Davison et al.

[11] Patent Number: 4,911,831
[45] Date of Patent: Mar. 27, 1990

[54] SLOW SAND FILTERS

[75] Inventors: Roger Davison, Billericay, United Kingdom; Michael J. Bauer, London, England

[73] Assignee: Thames Water Authority, Reading, England

[21] Appl. No.: 250,097

[22] Filed: Sep. 28, 1988

[30] Foreign Application Priority Data

Oct. 2, 1987 [GB] United Kingdom ............... 8723221

[51] Int. Cl.$^4$ .............................................. B01D 23/16
[52] U.S. Cl. ........................................... 210/86; 37/57; 37/DIG. 19; 210/106; 210/271
[58] Field of Search ........ 210/776, 106, 170, 269-273, 210/276, 523, 525, 527, 86; 37/57, 54, 66, 67, DIG. 8, DIG. 9, DIG. 1, DIG. 19; 405/129; 33/366; 356/375; 414/786

[56] References Cited

U.S. PATENT DOCUMENTS

| | | | |
|---|---|---|---|
| 1,617,654 | 2/1927 | Sivade | 210/273 |
| 2,327,726 | 8/1943 | Lose, Jr. | 210/271 |
| 4,005,019 | 1/1977 | Parlette | 210/527 |
| 4,070,978 | 1/1978 | Virgilo | 37/54 |
| 4,104,813 | 8/1978 | Lindsey | 37/57 |
| 4,290,890 | 9/1981 | Bauer | 210/776 |
| 4,291,474 | 9/1981 | Schmidt | 37/67 |
| 4,413,433 | 11/1983 | Duverne | 37/54 |
| 4,584,784 | 4/1986 | Wolters et al. | 37/DIG. 1 |
| 4,628,623 | 12/1986 | Deal | 37/66 |
| 4,759,138 | 7/1988 | Grinsted | 37/54 |

FOREIGN PATENT DOCUMENTS

| | | | |
|---|---|---|---|
| 1049361 | 1/1959 | Fed. Rep. of Germany | 210/271 |
| 0062302 | 10/1978 | Fed. Rep. of Germany | 210/270 |
| 2800628 | 7/1979 | Fed. Rep. of Germany | 210/270 |
| 344396 | 11/1904 | France | 210/271 |
| 557656 | 8/1923 | France | 210/271 |
| 758249 | 1/1934 | France | 210/271 |
| 2554736 | 5/1985 | France | 210/271 |
| 0664930 | 5/1979 | Japan | 210/523 |
| 608381 | 1/1979 | Switzerland | 210/271 |
| 205818 | 6/1924 | United Kingdom | 210/271 |
| 2151153 | 7/1985 | United Kingdom | 210/271 |
| 2190602 | 11/1987 | United Kingdom | 210/271 |

OTHER PUBLICATIONS

The Harris Group of Companies Brochure, pp. 1-15.

Primary Examiner—Frank Spear
Assistant Examiner—Joseph Drodge
Attorney, Agent, or Firm—Arnold, White & Durkee

[57] ABSTRACT

The invention relates to an apparatus for cleaning a slow sand filter for a body of liquid while the liquid is in situ, in which there is a carrier adapted to traverse the body of liquid, and a device carried by the carrier and adapted to skim successive layers of sand from the filter. The carrier is a floatable vessel and the skimmer device is an auger. The skimmer device is controlled by depth control means which are automatically adjusted in response to the contour of the filter.

34 Claims, 8 Drawing Sheets

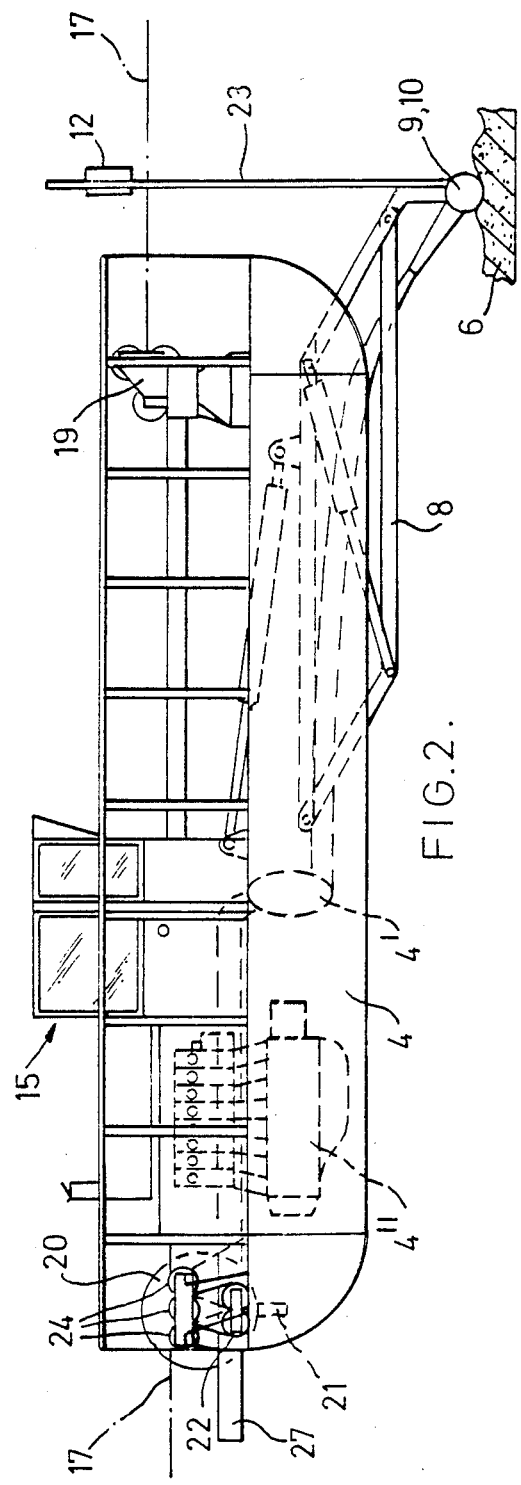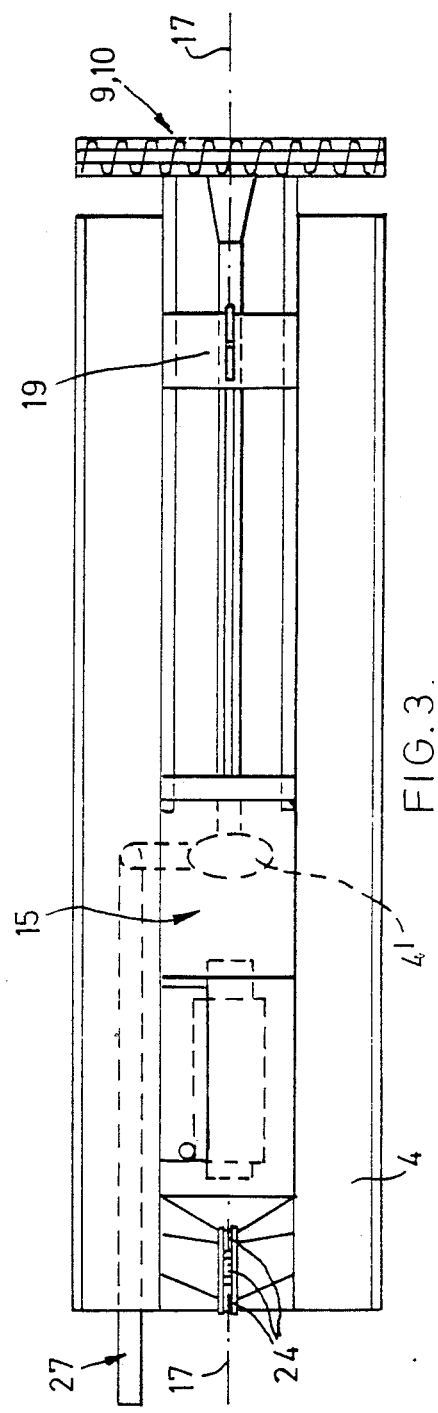

SLOW SAND FILTERS

FIELD OF THE INVENTION

The invention relates to slow sand filters. Such filters are usually in the form of rectangular beds (though any shape could be used) of sand. The beds contain a body of liquid which is usually water, the water percolating through the sand to be filtered and cleaned by mechanical and microbiological action in the bed. The water is then, after suitable further treatment, used as main supply water.

DESCRIPTION OF THE RELATED ART

Slow sand filter plants are usually expensive and extensive installations comprising several filter beds. Typically, a slow sand filter has a surface area of 3100 $m^2$. Each filter bed, hereinafter referred to as a filter, is usually a rectangular pit having built up walls and a base, spaced above, which is the actual floor of the bed, on which is supported a layer of gravel, and on that there is a layer of sand. The water to be cleaned is above the sand and is open to the atmosphere. It percolates through the sand, gravel, floor and into the space below the floor and the base, respectively the water being drawn from the space through suitable pipe work etc. It is then treated further before being fed to the main supply.

The sand is the primary cleansing agent and must be cleaned periodically to be cleaned because the top layers become clogged with algae, debris and plant life so that the pores become filled and the water cannot properly percolate through, thus slowing down the filtering process. In any event, the top layer becomes "spent" and cannot filter the water as required.

In order to clean the sand, the present conventional method is generally to remove the water and then use ramps, which may be permanent or mobile and installed by a crane, to allow passage of mechanical skimmers and dumpers to travel over the bed scooping up and removing the sand. The sand has to be carried away to be cleaned, and then has to be spread back in place and smoothed off manually to the required contour. Filters, being large bodies of essentially currentless water, are susceptible to the growth of weeds, particularly in the U.K. in the months of July to October. As much as 60 $m^3$ of weeds per day have to be removed from each filter before the dumpers and mechanical skimmers are brought into operation. All these operations are labor intensive. Moreover, the cleaning is a lengthy and inefficient operation, as the filter being empty of water is essentially "down" and is off-stream. Further, the skimmers, dumpers and men compact the remaining sand, which reduces the intergranular spaces or pores and thus slow down the filter process when the water is returned to the filter.

SUMMARY OF THE INVENTION

It is accordingly an object of the invention to mitigate these disadvantages.

According to one aspect of the invention there is provided apparatus for cleaning a slow sand filter for a body of liquid while the liquid is in situ, characterised by a carrier adapted to traverse the body of liquid, and by a device carried by the carrier and adapted to skim successive layers of sand from the filter.

The carrier may comprise a vessel adapted to float on the surface of the body of liquid.

Alternatively, the carrier may comprise a mobile gantry spanning the body of liquid in use and being adapted by supports alongside the body of liquid for traversing the same.

There may be a conduit for conducting removed sand from the vessel to a remote sand cleaning plant. This provides for a central sand cleansing operation.

There may be means to control the position of the skimming device to provide a controlled depth of skim for each layer. This provides the required degree of control to produce a skim within required tolerances.

The controlling means may be an electronic controlling means. This can provide for a solid state control.

The electronic controlling means may comprise a laser means which may comprise a laser transmitter defining a reference plane height and a laser receiver mounted on the skimming device.

The laser transmitter may be mounted at a fixed point adjacent to the body of water, and the laser receiver may be mounted on a substantially upright support means projecting from the skimming device and arranged so that the laser receiver is above the level of the body of water.

There may be depth of skim sensing means. This is to assist in controlling the depth of cut.

The depth of skim sensing means may comprise a visual device, such as a television camera device.

The depth of skim sensing means may alternatively comprise an audio/visual device.

The skimming device may comprise opposed auger screws and a suction device for removing skimmed sand as a slurry with water. The auger device may be housed within a shroud to which the suction device may be connected. The angle of the shroud may be adjustable. This enables the skimming to be bi-directional and for skims in the range of 15–50 mm to be cut.

Alternatively, the skimming device(s) may be in the form of a sand cutting/scooping blade(s) and full width suction hood with or without shrouding.

The device(s) auger or blade type may include water jet nozzles for the loosening of sand prior to suction removal.

The device(s) auger or blade type may include a means of cutting weed prior to suction removal.

There may be a control device for controlling movement of the vessel over the body of liquid.

The control device may comprise substantially parallel guides respectively at opposed positions on opposite sides of the body of liquid, a carriage on each guide and a cable device connected between the carriage devices and which may be connected with the vessel for guiding and drawing same over the body of liquid.

The apparatus may include a device to switch the cable to adjust the position of the vessel on the surface of the body of liquid.

There may be means for sensing and controlling the speed of the vessel over the body of liquid. The sensing means may comprise optical sensing means associated with the cable means. There may be a device to tension the cable means. The cable tensioning device may comprise a hydraulic cable tensioning device.

There may be means to monitor the amount of sand being transmitted through the conduit to the remote sand cleaning plant. The sand monitoring means may comprise a flow meter in the conduit.

There may also be means for the measurement of sand density as a part, perhaps an integral part, of sand flow determination or monitoring means.

The conduit may be adapted to float substantially at the surface of the body of liquid.

There may be means to separate weed from the liquid and sand.

The apparatus may include means to feed cleaned sand to the filter bed in situ while the body of liquid is in place.

The sand feeding means may comprise a spreader device carried by the vessel.

The sand spreader device and auger may be interchangeable.

The auger and/or spreader device may be carried by a framework which is movable between two positions, one of which is at the surface of the filter bed and the other of which is at or near the surface of the body of liquid.

The vessel may have an on-board motor means for drawing it over the body of water.

The vessel may have a control console on board, operable by a driver of the vessel for determining operating parameters of the apparatus.

According to a second aspect of the invention there is provided a system comprising a slow sand filter bed filled with water and apparatus for cleaning the slow sand filter bed substantially as hereinbefore defined.

BRIEF DESCRIPTION OF THE DRAWINGS

The apparatus embodying the invention is hereinafter described, by way of example, with reference to the accompanying drawings.

FIG. 2 is a side elevational view of a floating vessel used in the apparatus of FIG. 1;

FIG. 3 is a plan view of the vessel of FIG. 2;

DESCRIPTION OF THE PREFERRED EMBODIMENTS

Figure 1:
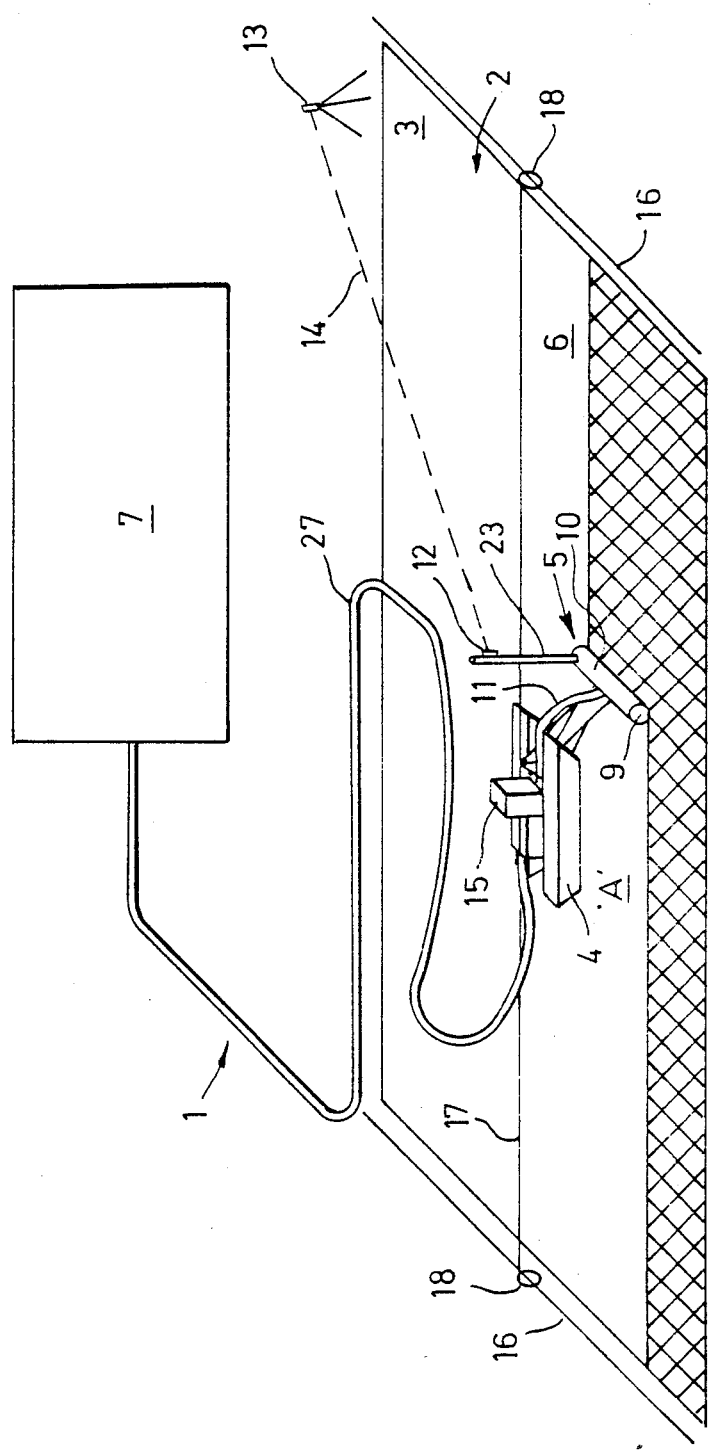
FIG. 1 is a schematic layout of one embodiment of the apparatus according to the invention and a filter system utilizing same.
Figure 4:
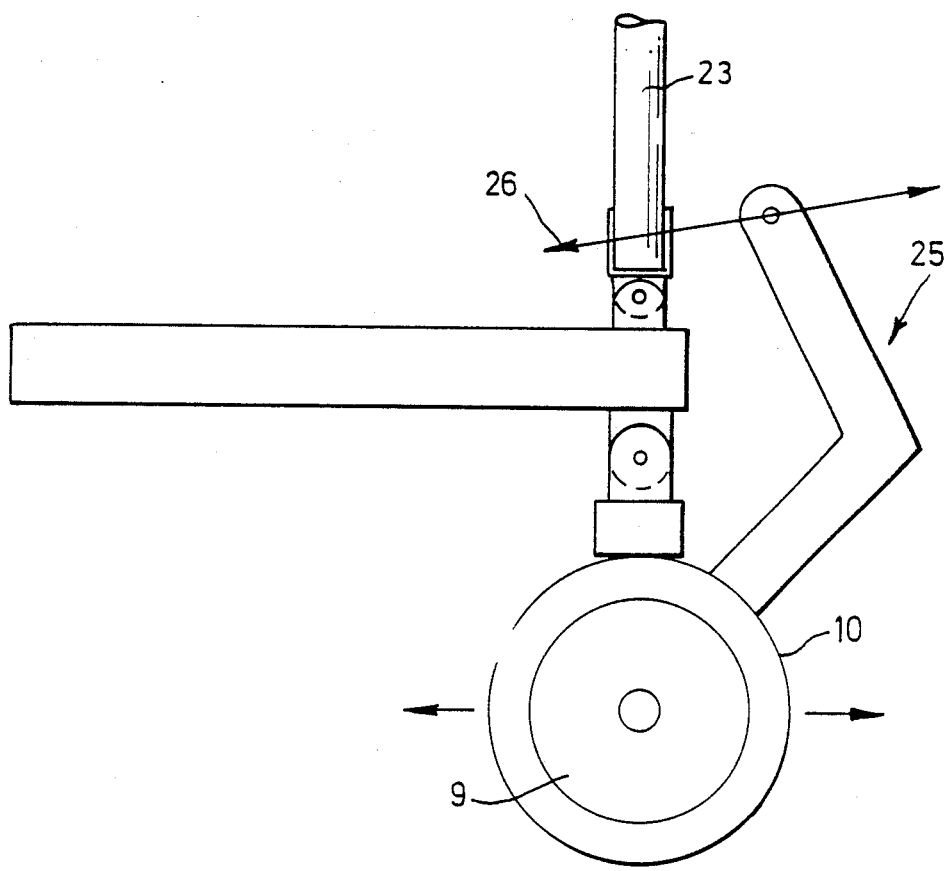
FIG. 4 is an enlarged detail view of part of the vessel of FIGS. 2 and 3.
Figure 5:
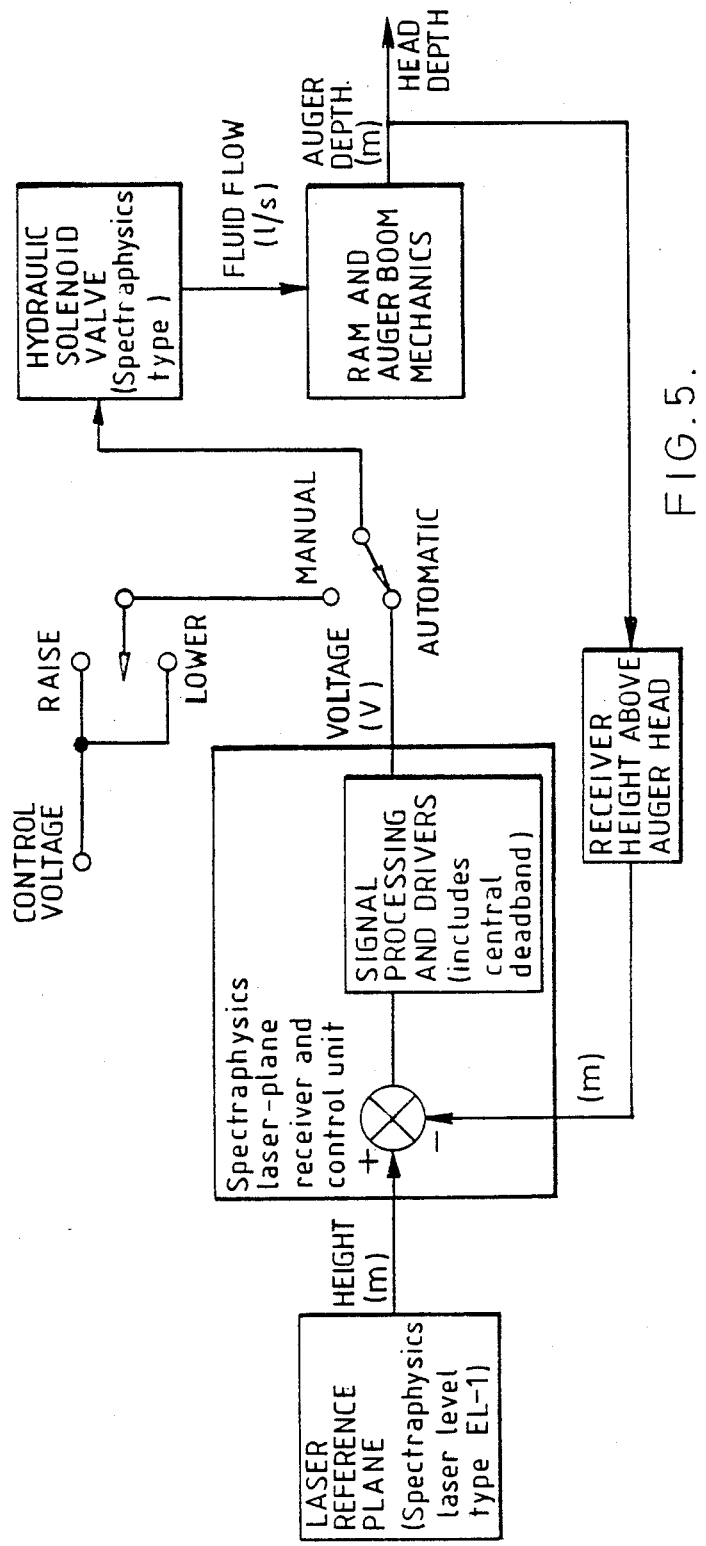
FIG. 5 is a flow sheet of a suction dredging laser depth control system used in the apparatus according to the invention.
Figure 6:
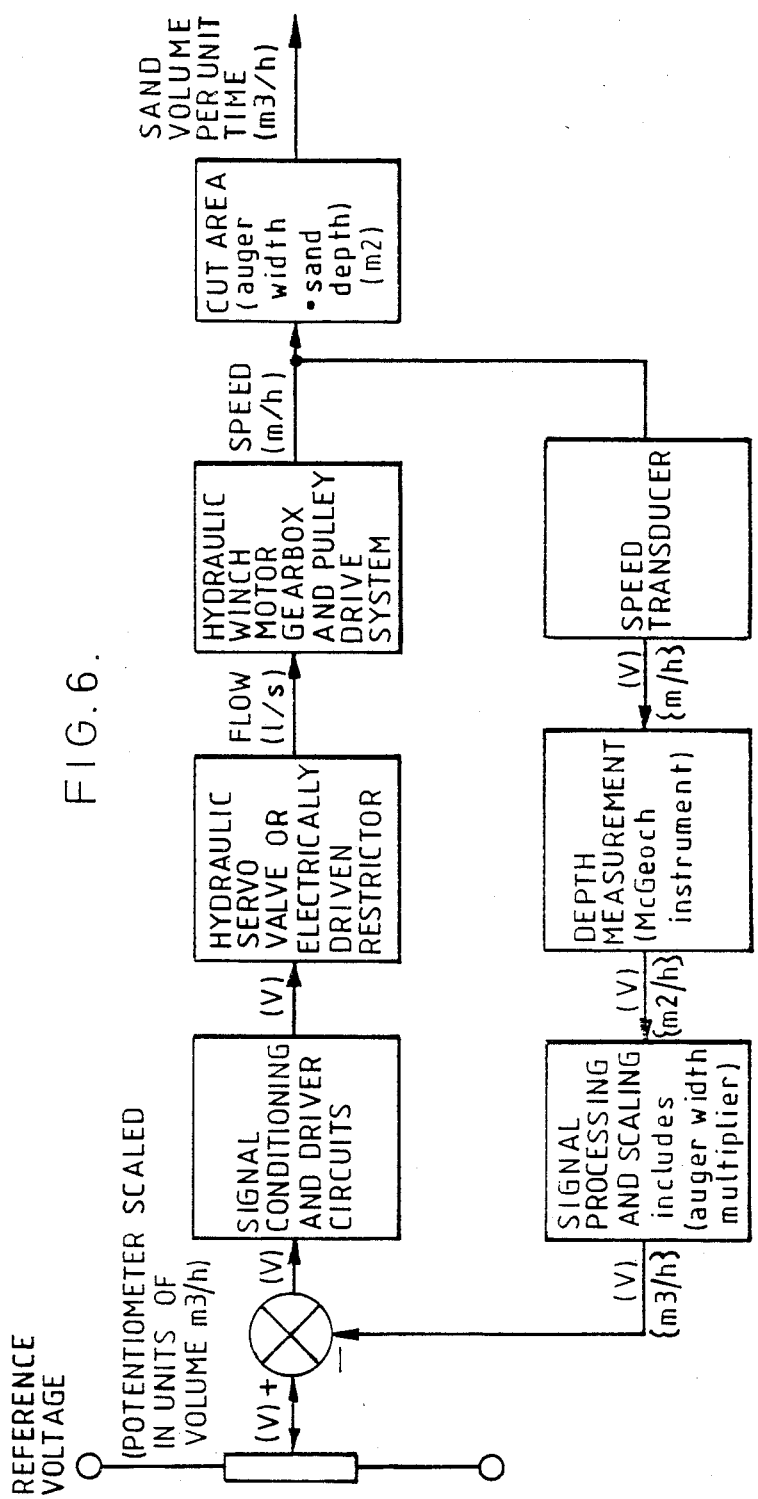
FIGS. 6 and 6A are respectively alternative sand volume control systems used in apparatus according to the invention, FIG. 6 showing a system based on speed and cut depth of sand, and FIG. 6A showing a system based on auger motor pressure.
Figure 6A:
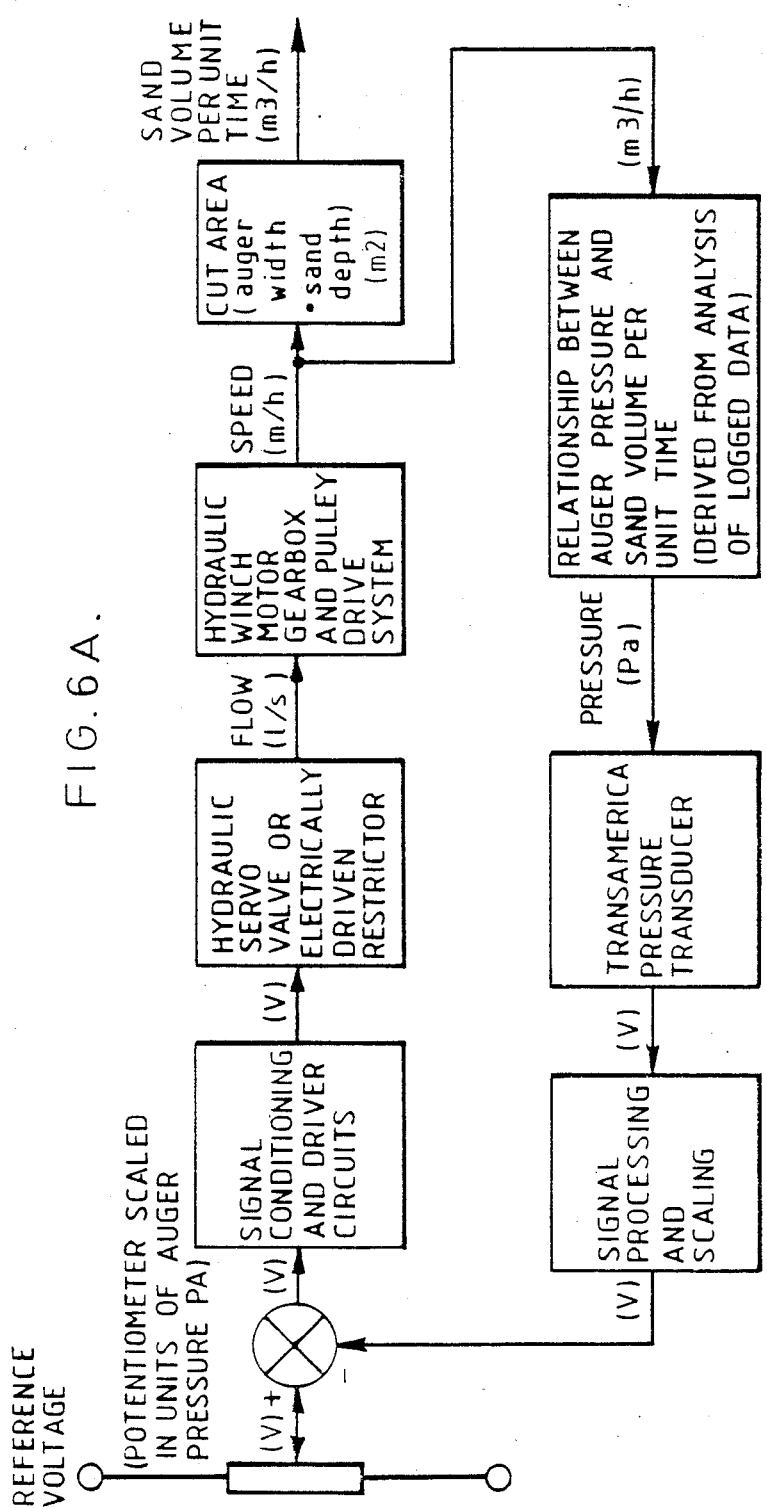

Referring to the drawings, in which like parts are identified by like numerals, there is shown apparatus 1 for cleaning a slow sand filter 2 for a body of liquid 3, in this case water at a water treatment plant, while the water is in situ, comprising a vessel 4 (FIGS. 1-3) adapted to float on the surface of the body of water 3, and a device 5 carried by the vessel 4 and adapted to skim successive layers of sand 6 from the filter 2 and remove the sand for cleaning by sand plant 7 which in the embodiment shown is remote (up to 1000 m) from the filter 2. The sand 6 has typically a particle size of between 0.2 mm and 4 mm diameter.

The vessel 4 is a floating barge which carries via a hydraulic ram system 8 the device 5 which comprises a double pitch auger 9 in a shroud 10. The shroud 10 is connected via a suction pipe 11 to suction apparatus such as a pump 4' and power unit 4" on the vessel 4 which passes in use a slurry of sand and water (between 15%-30% sand on a weight:weight basis, and preferably 20% sand 80% water w/w) to a floating conduit 27 which passes the slurry to the remote (on-shore) sand cleaning plant 7 where the sand is cleaned for return to the filter 2. The vessel 4 carries a centrifugal gravel/sand slurry pump to provide the suction of sand from the auger head and also the delivery of the sand via the conduit 11 to the sand cleaning plant 7.

Alternatively, a clean water pump and sand jet pump may be utilized to achieve the same result.

The hydraulic ram system 8 moves the auger 9 and shroud 10 from a position in which the auger can skim and 6 from the filter 2 to a required, desired depth, and an inoperative position at or adjacent the water level. There is mounted on the shroud or elsewhere suitably an upstanding frame or tower 23, suitably of aluminium, which carries an electronic depth of cut or skim sensing means in the form of a laser receiver 12 which is aligned with a laser transmitter 13 on the shore to provide a desired reference plane height 14. Any deviation from the plane height 14 therefore gives a reading as to depth of cut of the auger 9, and hence a desired skim thickness to within $+/-10$ mm can be achieved, the setting and control being by way of electronic control apparatus such as a computer which can be in a control console in a cabin 15 for a driver of the vessel 4.

There is means for guiding and drawing the vessel over the water in the form of substantially parallel guides 16 in the form of locating rails on opposite sides of the filter 2. A rope or wire 17 is secured to saddle devices 18 on each rail 16 and passes over a drawing device 19 on the vessel 4 so that the vessel effectively winches itself along the wire 17 in a straight line, as seen in FIG. 1. There is a hydraulic cable tensioner 20 to ensure that the vessel 4 is controlled to move in a straight line to provide substantially parallel sweeps or strips when the vessel passes over the filter 2; in this way the whole of the filter bed can be skimmed. The cable tensioner 20 comprises a hydraulic ram 21 which maintains tension on the cable 17 by pulling down on pulleys 22 round which the cable 17 is trained in a channel frame or yoke also containing guide pulleys 24. The auger shroud 10 is adjustable relative to the horizontal movement during skimming by an articulated linkage 25 controlled by suitable means such as a hydraulic piston and cylinder arrangement 26.

Figure 7:
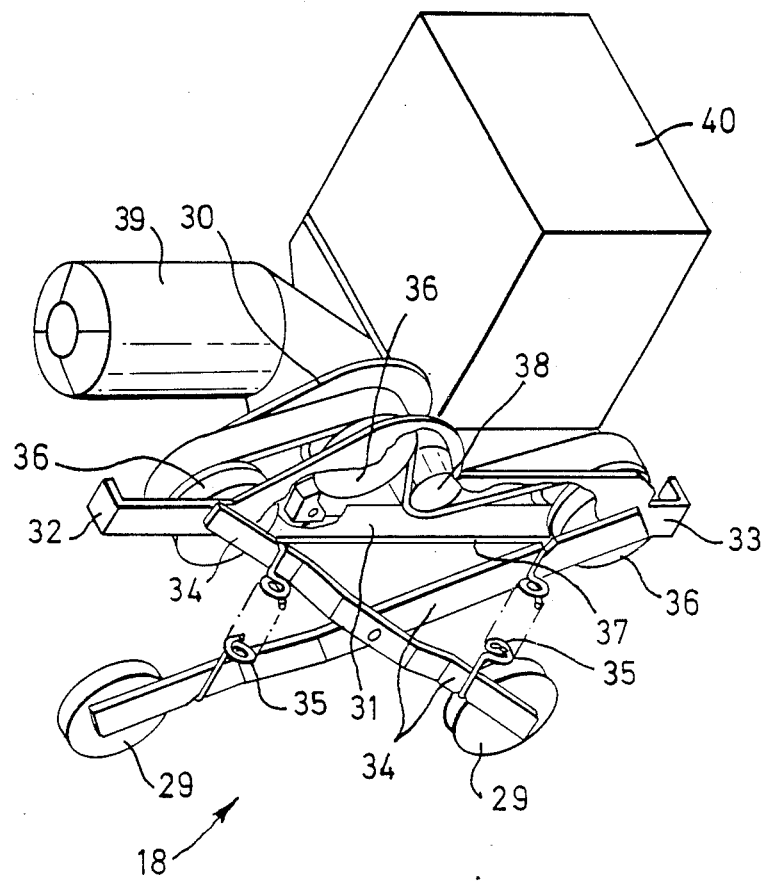
FIGS. 7 and 7A are respectively a schematic perspective view of a tractor for moving the vessel of FIGS. 1-3 laterally and a circuit diagram of an electrical power system of the tractor.
Figure 7A:
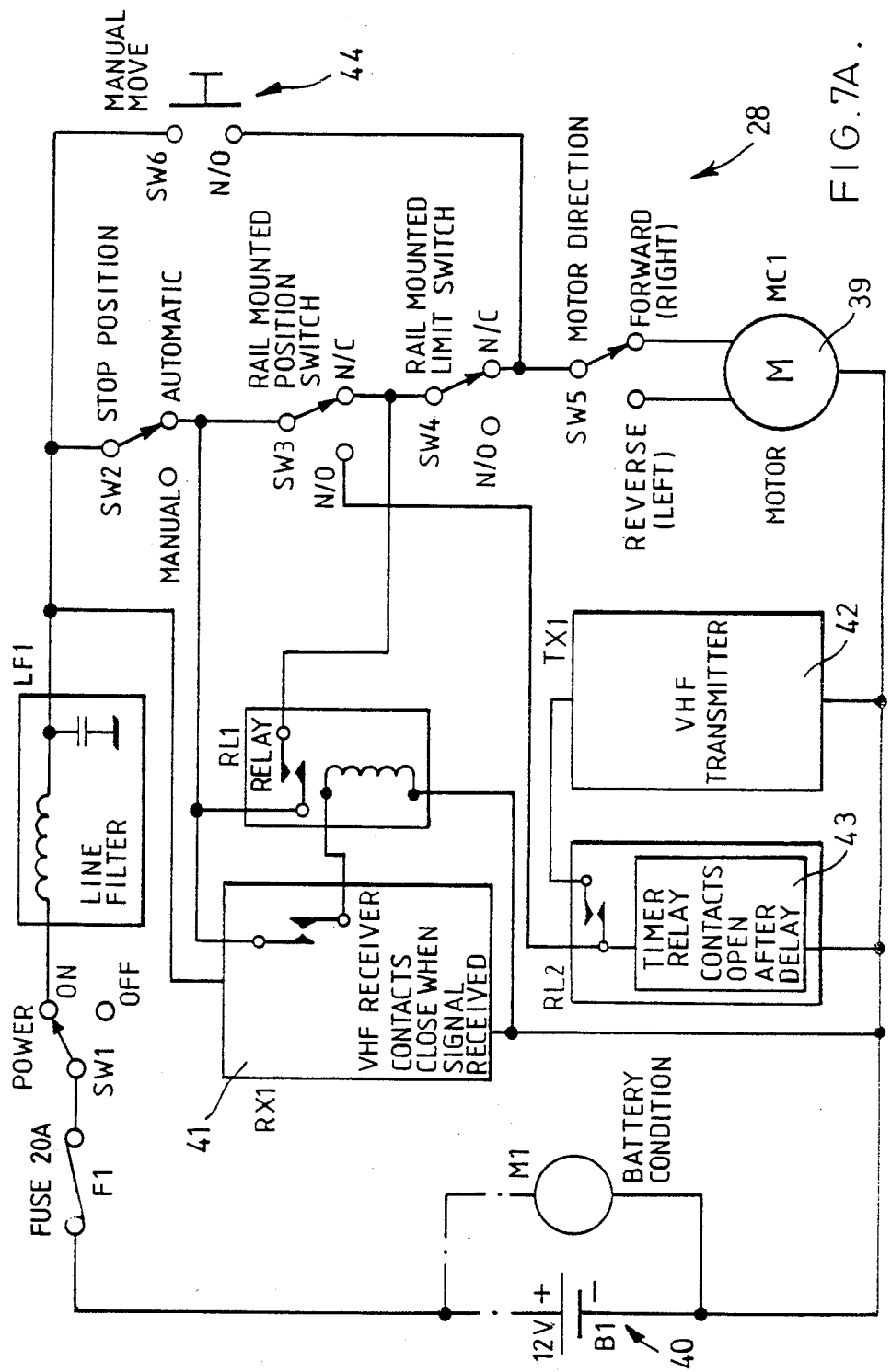

Referring now to FIGS. 7, 7A there is shown a detail and circuitry 28 for the saddle devices or tractor units 18 (shown generally in FIG. 1). The tractor units 18 are sited one on each rail 16 via wedge-shaped (V-profile) wheels 29 and are connected to the dredger vessel 4 by the winch drive wire or cable 17. The tractor units 18 are for moving the vessel 4 widthwise or laterally across the filter 2 in order to proceed with cleaning or skimming the next uncleaned strip to a strip which has just been skimmed and cleaned. Each tractor unit 18 has a chassis 30 with a side support plate 31 with opposite end stops 32 and 33 which side support plate 31 also supports pivotally connected 'x'-frame members or cross-braces 34 mounting the wheels 29, there being traction tensioning means in the form of coil springs 35 tensioned between superposed parts of the cross-braces 34. The chassis 30 also supports three toothed belt pulleys 36 round which is trained a toothed belt 37 which is also trained round a belt-tensioner 38 as well as round the pulleys 36. Mounted on the chassis 30 there is a high performance motor, (or motors), in the embodiment a 15 amp inductive DC motor 39 with a worm wheel kind of gear box so that the need to provide for braking of the tractor units 18 on the respective rails 16 is obviated. In the embodiment, there is an in-built battery 40 of 28 amp hr output, the electrical system being a 12-48 V system (preferably 24 V). As an alternative to the battery 40, the tractor units may be supplied from the vessel's own electrical system via the drive cable 17.

The tractors 18 may or may not have an integral device for resisting the hydraulically tensioned drive cable 17. The current drawn by the tractor units 18 may be as high as 30 amps each resulting in relay operation.

Four input signals are utilized to control the tractor units utilizing the circuit 28 shown in FIG. 7A, the circuit including a VHF receiver 41 and a VHF transmitter 42 as well as various switches, relays and a timer 43. The four input signals may be identified as:

| 1. GO NOT STOP | G/S |
|---|---|
| 2. POSITION NOT POSITION | P/G |
| 3. END LIMIT (FORWARD NOT REVERSE) | F/R |
| 4. ERROR/ERROR | Er/OK |

The four input signals cross into the tractor electrical control system or circuit boundary and are generated by the position of each tractor unit 18 on its respective rail 16, the position of the vessel 4 on the drive cable 17 and the tension of the cable 17. The outputs from the tractor control system are identified as:

| 1. GO NOT STOP | G/S | (to motor control circuit) |
|---|---|---|
| 2. FORWARD/NOT REVERSE | F/R | (to motor control circuit) be |
| 3. ERROR | | (back to dredger master controller) |

In use, when the dredger vessel 4 is at the end of a run, in other words it has traversed one whole length of the filter 2, and has cleaned a strip 'A' the width of the auger 9, the drive cable 17 is detensioned, and the tractors 18 move the vessel 4 laterally (transverse to its length or the direction of movement to clean strip 'A') in order to relocate the dredger vessel 4 widthwise in order to be ready to commence movement to skim and clean the next strip, adjacent the cleaned strip 'A'. This movement is thus a bodily lateral shifting movement of the whole apparatus 1, comprising the two tractor units 18, the vessel 4 and the cable 17. Such movement is initiated by a manually operated switch 44 incorporated on each tractor unit, in its circuit 28. In an alternative system, such movement is by radio communication via the dredger vessel operator. Again, an automated system may be utilized in which the tractor units 18 have a memory element on board to monitor whether they are in the forward or reverse mode. This in its simplest mode is accomplished by a two way switch togged at the ends of the rail 16 by a pin operated by the stops 32 or 33 or a counter system monitoring the number of strips 'A' moved through.

Such automation of the control system may comprise either hard wired relays and position switches and hard wired logic elements +VHF receiver/transmitter+- timer, or programmable Logic Controlled hard wire relays and position switches (sensor)+VHF receiver/- transmitter.

In the embodiment the tractors 18 are controlled by one single pole single throw switch and one double pole double throw switch, the single pole switch being used for the GO or STOP control of the unit and the double switch for changing direction of the tractors. These two signals are directly analogous to two of the outputs from the automated tractor control system. The error signal is also present but is relayed directly by the human operator. This signal would be generated by a timer on the final system which would be disabled when it gets to the strip or station position switch.

It will be understood that the tractor units are relocated onto the rail system of another filter bed 2 at the same time that the dredger 4 is moved.

In use, the vessel 4 is placed in the water connected up with the cable mechanism and via the conduit 27 to the cleansing plant 7 and is then set up via the electronics and laser system to cut or skim a desired depth of sand. A sand monitor such as a flow meter in the conduit 27 monitors the amount of sand in the slurry produced when the auger 9 is lowered and operated to cut into sand 6 and, with the laser controls the output. The laser, and any additional depth control such as a sonar apparatus or a televisional apparatus, then accurately controls the skim and the auger is continuously adjusted to follow the contour of the bed and produce the required depth of cut. The cut or skim can then be repeated as desired.

Figure 8:
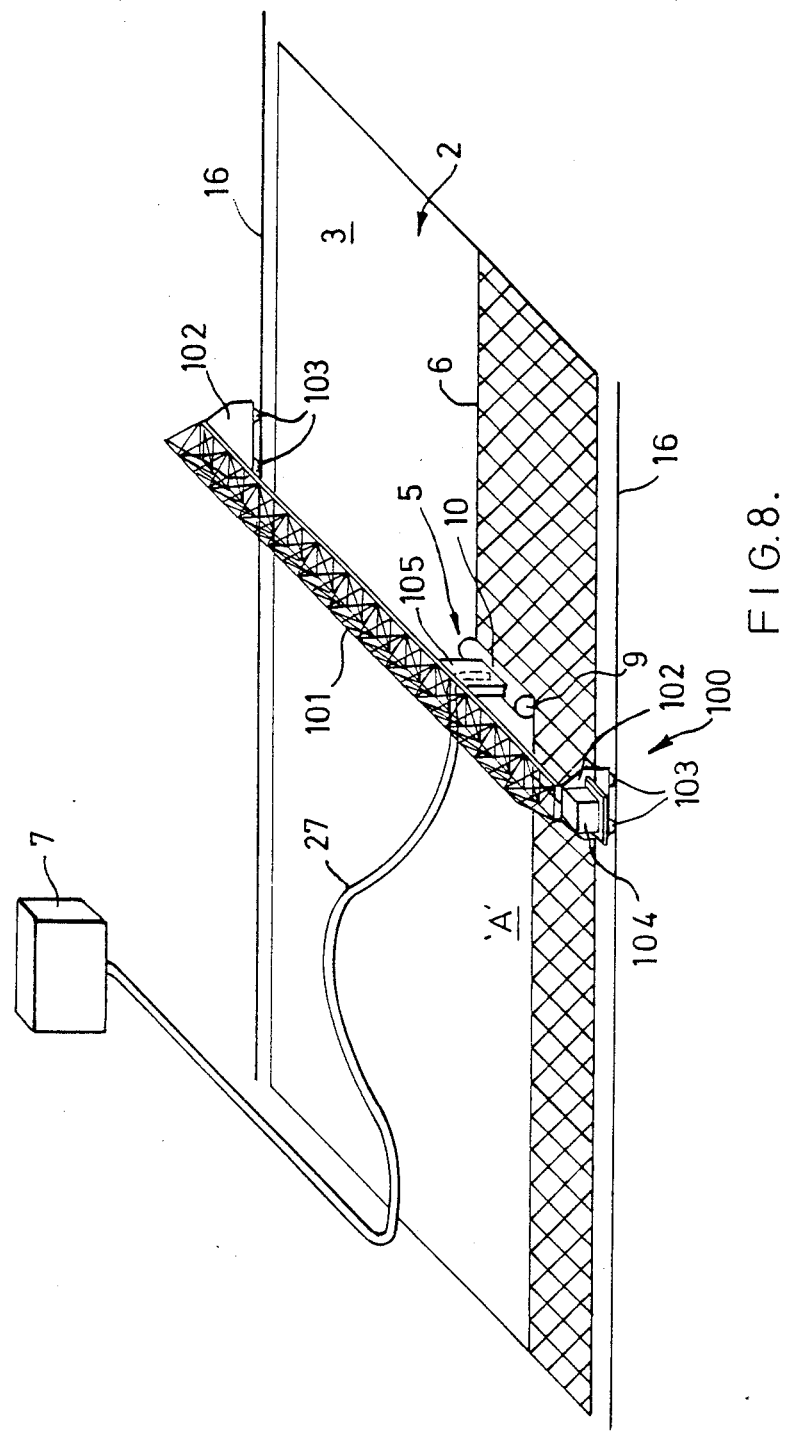
FIG. 8 is a schematic layout of a second embodiment of apparatus according to the invention and a filter system using same.

Referring now to FIG. 8, there is shown apparatus 100 for cleaning a slow sand filter for a body of liquid 3, in this case water at a water treatment plant, while the water is in situ, comprising a carrier in the form of a gantry or bridge 101 of lattice construction adapted to transverse the body of liquid 3 and a device 5 in the form of an auger carried by or mounted on the gantry or bridge 101 and adapted to skim successive layers of sand 6 from the filter 2 and pass it via flotable conduit 27 to a sand plant 7 which in the embodiment shown is remote (up to 1000 m) from the filter 2. The auger 5 has a shroud 10. The gantry 101 is mounted on guide rails 16 mounted at opposite sides of the filter 2 on towers 102 which have wheels 103 mounted for traverse movement along the rails 16 and a built-in power unit 104 for moving the gantry without slewing (with respect to the length of the filter 2) along the rails 16. The power units 104 may be electric or diesel or any suitable means. The auger 5 depends from the gantry on a suspension arm 105 which is mounted on a bogie for traversing the gantry and hence laterally of the filter 2 so that the width of the filter is skimmed and cleaned by adjusting the position of the bogie and hence the auger 5 along the gantry. The position of the bogies is set as desired. The bogie may be driven by means, suitably from the power unit 104.

The apparatus 100 may be moved to and used on any filter 2. The apparatus 100 will it be understood move over a filter cleaning the sand in strips 'A' as described with reference to the apparatus 1 of the first embodiment, so the description will not be repeated.

It will be understood that the sand when cleaned may also be returned to the bed with the water in situ by using a spreader (not shown) which may be a completely separate device controlled from the skimmer or in place of or including the auger, the shroud 10 helping to prevent dusting and to ensure that the sand is applied as desired.

There has thus been described apparatus 1, 100 which can accurately skim (+/−10 mm) a surface layer of dirty sand of preselected nominal depth in the range 15 to 50 mm in increments of 10 mm. This covers normal bed cleaning. For deep skimming, then depths of up to 150 mm and skimmers removing 60 tons/hr plus are possible. The skimming process takes place with the filter covered by 1 to 2 m of water (i.e. without draining). The dirty sand is removed from the filter in the form of a water based slurry which is to be pumped to a receiving bay or sand washing plant up to 500 m distant.

The skimmer removes sand at a rate variable between 30 and 60 plus tones per hour (15 to 30 m$^3$/h). The preferred rate is 50 tons per hour (25 m$^3$/h). For calculation purposes 1 m$^3$ of damp dirty sand is assumed to weigh 2 tons.

The skimmer is capable of skimming at a rate of at least 500 m$^2$ bed area per hour at a skim depth of 50 mm. Typical skimming rates are at least 1000 m$^2$/h at 25 mm skim depth. Converting area coverage rate to forward velocity will depend on auger width. An auger width of 2.44 m (8 ft) equates to a velocity of 205 m/h for 500 m$^2$/h bed coverage and 410 m/h for 1000 m$^2$/h. Wider augers with one or multiple suction pump inlet(s) may be considered.

The target sand/water ratio in the slurry is between 15 and 30% expressed on a weight/weight basis. The preferred ratio is 20% sand, 80% water w/w. The preferred ratio equates to a slurry flow rate of 250 m$^3$/h at a sand transfer rate of 50 tons/h.

The skimmer head (auger and shroud) are capable of following undulations in filter bed surface level with slopes of up to 25 mm rise/fall per meter horizontal travel (2.5%). The skimmer preferably leaves no area of visibly dirty sand after a skim, skimming as close as possible to walls, preferably to less than 50 mm and also planes out the contours leaving a level sand surface (+/−10 mm). The maximum acceptable total area of visibly dirty sand is no more than 2% of filter area (62 m$^2$ in a typical 3100 m$^2$ filter).

Algal and silty material are not disturbed during skimming in any manner that results in redeposition of the material on areas already cleaned.

It will be understood that the auger may be modified as to width, flight outer diameter, core diameter, flight pitch, number of starts, rotational rate, shrouding, ski mounts, cutting edge and material of construction.

It will also be understood that the vessel 4 may be powered by electric cable of diesel, and may be moved between filters by crane, gantry on a rail network, driven up and/or down fixed ramps or floated between filters by the use of locks built into the side walls. The conduit 7 may also be part of a network of interconnecting pipes with isolation/balancing valves, flushing/draining out provisions, and multiple connection points such that two or more vessels 4 or grantries 101 may be connected at any one time, all feeding the sand cleaning plant(s) 7 concurrently. The network may have provision for the insertion of mobile in-line sand slurry booster pump(s).

The vessel 4 or gantry 101 may carry more than one device 5, 10 which can or are designed to skim bi-directionally. The separate device(s) of auger or blade type may include means of cutting weed prior to suction removal.

We claim:

1. An apparatus for cleaning a slow sand filter under a body of liquid while the liquid is present, comprising:
   a filter comprising at least one filter bed having a plurality of filtration layers one of which is a sand layer
   a carrier adapted to traverse the body of liquid;
   a skimming device integral with the carrier and adapted to skim successive layers of sand from the filter and pass it to said carrier; and
   depth control means for controlling the skimming device to provide a controlled depth of skim for each layer of sand comprising means for automatically adjusting said skim depth in response to the contour of an upper surface of the sand filter.

2. The apparatus of claim 1, wherein the carrier is a vessel adapted to float on the surface of the body of liquid.

3. The apparatus of claim 2, further comprising conduit means for passing removed sand from the vessel to a remote sand cleaning plant.

4. The apparatus of claim 3, further comprising means to monitor removed sand volume passing through the conduit means to the remote sand cleaning plant.

5. The apparatus of claim 4, wherein the sand monitor means comprises a flow meter.

6. The apparatus of claim 4, wherein the sand monitor means comprises sand density measurement means.

7. The apparatus of claim 4, wherein the conduit means is adapted to float substantially at the surface of the body of liquid.

8. The apparatus of claim 2, wherein the vessel has an on board motor means for transporting the vessel over the body of liquid.

9. The apparatus of claim 2, wherein the vessel has a control console on board, operable by a driver of the vessel for determining operating parameters of the apparatus.

10. The apparatus of claim 1, wherein the carrier comprises a mobile gantry spanning the body of liquid during use, wherein the gantry is supported by supports adjacent the body of liquid, whereby the gantry physically spans the body of liquid.

11. The apparatus of claim 10, further comprising conduit means for passing removed sand from the mobile gantry to a remote sand cleaning plant.

12. The apparatus of claim 10, wherein the skimming device and depth control means are carried by a framework which is moveable between two positions, one position being at the surface of the filter bed and the other position being at the surface of the body of liquid.

13. The apparatus of claim 1, wherein the depth control means is an electronic controlling means.

14. The apparatus of claim 1, wherein the controlling means is electronic comprising a laser transmitter mounted adjacent the body of liquid and a laser receiver mounted on the skimming device.

15. The apparatus of claim 1, wherein the controlling means is electronic comprising a laser transmitter mounted at a fixed point adjacent the body of liquid and a laser receiver mounted on a substantially upright support means projecting from the skimming device and arranged so that said laser receiver is above the level of the body of liquid.

16. The apparatus of claim 1, further comprising depth sensing means for sensing the depth of skim of sand removed by the skimming device.

17. The apparatus of claim 16, wherein the depth of skim sensing means comprises a sonar device.

18. The apparatus of claim 16, wherein the depth of skim sensing means comprises a visual device.

19. The apparatus of claim 18, wherein the visual device comprises a television camera device.

20. The apparatus of claim 16, wherein the depth of skim sensing means comprises an audio/visual device.

21. The apparatus of claim 1, wherein the skimming device comprises opposed auger screws and a suction device for removing skimmed sand as a slurry mixed with water derived from the body of liquid.

22. The apparatus of claim 21, further comprising a shroud wherein the auger device is housed within the shroud and the suction device is connected to the shroud.

23. The apparatus of claim 22, wherein the shroud is angularly adjustable in relation to the auger device.

24. The apparatus of claim 1, further comprising a control device for controlling movement of the carrier over the body of liquid.

25. The apparatus of claim 24, wherein the control device comprises substantially parallel guides respectively at opposed positions on opposite sides of the body of liquid, a carriage positioned on each guide, and a cable device connected between the carriage devices, said cable device being connected with the carrier for guiding and drawing same over the body of liquid.

26. The apparatus of claim 25, further comprising a device to switch the cable device to adjust the position of the carrier on the surface of the body of liquid.

27. The apparatus of claim 25, further comprising a device to tension the cable device.

28. The apparatus as defined in claim 24, further comprising means for sensing and controlling the speed of the carrier over the body of liquid.

29. The apparatus of claim 28, wherein the sensing means comprises optical sensing means.

30. The apparatus of claim 24, further comprising a hydraulic cable tensioning device.

31. The apparatus of claim 1, further comprising means to separate weeds from the liquid and sand.

32. The apparatus of claim 1, further comprising means to feed cleaned sand to the filter bed while the body of liquid is in place.

33. The apparatus of claim 32, wherein the sand feeding means comprises a spreader device.

34. The apparatus of claim 33, wherein the spreader device and skimmer device are interchangeable.

* * * * *